United States Patent
Banterle et al.

(10) Patent No.: US 9,406,112 B2
(45) Date of Patent: Aug. 2, 2016

(54) VIDEO DATA COMPRESSION

(75) Inventors: Francesco Banterle, Negrar (IT); Alessandro Artusi, Nicosia (CY); Kurt Debattista, Warwickshire (GB); Patrick Ledda, London (GB); Gerhard Bonnet, Kaisersalutern (DE); Gavin John Edwards, Warwickshire (GB); Alan Chalmers, Kenilworth (GB)

(73) Assignee: University of Warwick, Coventry (GB)

( * ) Notice: Subject to any disclaimer, the term of this patent is extended or adjusted under 35 U.S.C. 154(b) by 697 days.

(21) Appl. No.: 12/984,992

(22) Filed: Jan. 5, 2011

(65) Prior Publication Data

US 2011/0235720 A1 Sep. 29, 2011

Related U.S. Application Data

(63) Continuation-in-part of application No. PCT/EP2009/005042, filed on Jul. 10, 2009.

(30) Foreign Application Priority Data

Jul. 10, 2008 (EP) ..................................... 08012452

(51) Int. Cl.
| | |
|---|---|
| G06T 5/00 | (2006.01) |
| H04N 19/33 | (2014.01) |
| H04N 19/34 | (2014.01) |
| H04N 19/61 | (2014.01) |
| H04N 19/176 | (2014.01) |

(Continued)

(52) U.S. Cl.
CPC ............... *G06T 5/009* (2013.01); *H04N 19/33* (2014.11); *H04N 19/34* (2014.11); *G06T 5/007* (2013.01); *G06T 2207/10016* (2013.01); *G06T 2207/20028* (2013.01); *H04N 7/50* (2013.01);

*H04N 19/00315* (2013.01); *H04N 19/136* (2014.11); *H04N 19/176* (2014.11)

(58) Field of Classification Search
None
See application file for complete search history.

(56) References Cited

U.S. PATENT DOCUMENTS 6,301,393 B1 * 10/2001 Spaulding et al. ............. 382/240
6,993,076 B1 * 1/2006 Comer et al. ............. 375/240.16

(Continued)

FOREIGN PATENT DOCUMENTS

EP 1827024 A 8/2007

OTHER PUBLICATIONS

Fredo Durand, Julie Dorsey, Fast Bilateral Filtering for the Display of High-Dynamic-Range Images, 2002, SIGGRAPH2002, p. 1.*

(Continued)

*Primary Examiner* — Geepy Pe
*Assistant Examiner* — William Adrovel
(74) *Attorney, Agent, or Firm* — McDonnell Boehnen Hulbert & Berghoff LLP (57) ABSTRACT

A method of producing a compressed video data stream (12) by compressing a stream of relatively high dynamic range video frames (2). A bilateral filter (3) extracts a base frame (4) with luminance information. The base frame (4) and the original frame (2) are used to provide a detail frame (5) with chroma information. A tone mapping operation (6) is selected (7, 11) and applied to the base frame to generate a relatively low dynamic range base frame (8), which is then compressed (9). The detail frame (5) is compressed separately. Final frame data (12) is then created, consisting of the compressed relatively low dynamic range base frame, the compressed detail frame, and stored information in respect of the tone mapping operation that had been applied to the base frame.

14 Claims, 3 Drawing Sheets

(51) Int. Cl.
H04N 19/186 (2014.01)
H04N 19/136 (2014.01)

(56) References Cited

U.S. PATENT DOCUMENTS

| | | | | |
|---|---|---|---|---|
| 7,146,059 | B1* | 12/2006 | Durand | G06T 5/007 345/617 |
| 8,233,536 | B2* | 7/2012 | Segall | 375/240.12 |
| 8,503,524 | B2* | 8/2013 | Segall | 375/240.11 |
| 2005/0259729 | A1* | 11/2005 | Sun | 375/240.1 |
| 2007/0201560 | A1* | 8/2007 | Segall | H04N 19/61 375/240.24 |
| 2008/0192819 | A1* | 8/2008 | Ward et al. | 375/240.02 |
| 2008/0310501 | A1* | 12/2008 | Ward et al. | 375/240.02 |
| 2009/0003718 | A1* | 1/2009 | Liu | H04N 19/176 382/238 |
| 2009/0110073 | A1* | 4/2009 | Wu | H04N 7/50 375/240.15 |
| 2010/0135393 | A1* | 6/2010 | Ying Gao | H04N 19/00315 375/240.15 |
| 2010/0172411 | A1* | 7/2010 | Efremov | H04N 19/136 375/240.12 |
| 2011/0090959 | A1* | 4/2011 | Wiegand et al. | 375/240.12 |
| 2011/0194618 | A1* | 8/2011 | Gish | G06T 5/50 375/240.25 |

OTHER PUBLICATIONS

Ishtiaq Rasool Khan, Two layer scheme for encoding of high dynamic range images, Mar. 31, 2008-Apr. 4, 2008, Acoustics, Speech and Signal Processing, 2008. ICASP 2008. IEEE International Conference on, 1169-1172.*
Hassan et al., A High Throughput Encoder for High Dynamic Range Images, Sep. 16, 2007-Oct. 19, 2007, Image Processing, 2007. ICIP 2007. IEEE International Conference on (vol. 6 ), VI-213-VI-216.*
Open Exr, downloaded from the World Wide Web from http://www.openexr.com/ on Aug. 6, 2013, 10 pages.
Blythe, David, The Direct3D 10 System, Microsoft Corporation, ACM, 2006, 11 pages.
Durand, Fredo et al., Fast Bilateral Filtering for the Display of High-Dynamic-Range Images, Laboratory for Computer Science, Massachusetts Institute of Technology, 2002, 10 pages.
Lefebvre, Sylvain et al., Compressed Random-Access Trees for Spatially Coherent Data, Eurographics Symposium on Rendering, 2007, 11 pages.
Li, Yuanzhen et al., Compressing and Companding High Dynamic Range Images with Subband Architectures, Dept. of Brain and Cognitive Sciences, and Computer Science and Artificial Intelligence Lab, Massachusetts Institute of Technology, 2005, 9 pages.
Mantiuk, Rafal et al., Backward Compatible High Dynamic Range MPEG Video Compression, MPI Informatik, 2006, 11 pages.
Mantiuk, Rafal et al., Perception-motivated High Dynamic Range Video Encoding, MPI Informatik, 2004, 9 pages.
Munkberg, Jacob et al, High Dynamic Range Texture Compression for Graphics Hardware, Lund University, 2006, 9 pages.
Okuda, Masahiro, Raw Image Encoding Based on Polynomial Approximation, 2007, 4 pages.
Ward, Greg, Graphic Gems II, Section II.5 Real Pixels, Academic Press Inc. 1991, 6 pages (on 3 sheets).
Roimela, Kimmo et al., Efficient High Dynamic Range Texture Compression, Nokia Research Center, ACM, 2008, 8 pages.
Roimela, Kimmo et al., High Dynamic Range Texture Compression, Nokia Research Center, ACM, 2006, 6 pages.
Mitchell, Jason et al., Shading in Valve's Source Engine, Chapter 8, Advanced real-time rendering in 3D graphics and games course, 2007, 14 pages.
Van Hateren, J.H., Encoding of high dynamic range video with a model of human codes, preprint of article published in: ACM Transactions on Graphics 25:1380-1399 (2006), 27 pages.
Wang, Lvdi et al., Rendering from compressed high dynamic range textures on programmable graphics hardware, I3D 2007, Seattle, Washington Apr. 30-May 2, 2007, 8 pages.
Ward, Greg, BrightSide Technologies, A general approach to backwards-compatible delivery of high dynamic range images and video, 2008, 7 pages.
Ward, Greg, BrightSide Technologies, JPEG-HDR: A backwards-compatible, high dynamic range extension to JPEG, 2006, 8 pages.
Larson, Gregory Ward, Silicon Graphics, Inc., The LogLuv Encoding for Full Gamut, High Dynamic Range Images, 1998, 7 pages.
Ward, Greg et al, Subband Encoding of High Dynamic Range Imagery, 2006, 8 pages.
Kilgard, Mark J. et al., EXT_Texture_shared_exponent, Jul. 18, 2008, 10 pages.
European Patent Office, International Search Report for International Application No. PCT/EP2009/005042, mailed Sep. 22, 2009, 3 pages.
Winken M. et al., Bit-depth Scalability in SVC, JVT-V078, Jan. 14, 2007, 9 pages.
Winken M. et al., Bit-depth scalable video coding, Image Processing, Sep. 1, 2007, 4 pages.
Liu, Shan et al., Inter-layer prediction for SVC bit-depth scalability; Joint Video Team (JVT) of ISO/IEC MPEG & ITU-T VCEG (ISO/IEC JTC1/SC29/WG11 and ITU-T SG16 Q6), Jun. 30, 2007, 12 pages.

* cited by examiner

VIDEO DATA COMPRESSION

REFERENCE TO PRIOR APPLICATION

This application is a continuation-in-part application of International Application number PCT/EP2009/005042 with an international filing date of Jul. 10, 2009. International Application number PCT/EP2009/005042 claims the benefit of European Patent Application No. 08012452.2 filed on Jul. 10, 2008.

FIELD OF THE INVENTION

The present invention relates to the handling of high quality video data, and in particular to techniques using tone mapping.

BACKGROUND TO THE INVENTION

The quality of digital images has vastly improved over the past few years. The number of pixels in a picture has increased due to improvements in both cameras and displays. For example, the resolution of commercial flat panel displays used for television has increased step by step from 640×480 pixels VGA resolution to full high definition having 1920× 1080 pixels. This has already brought about a change in the amount of data that needs to be handled to display an image. Furthermore, not only has the spatial resolution been improved, but also the dynamic resolution. For a black and white picture this would mean that a single pixel could represent any of a large number of different shades of grey instead of only being black or white. The overall dynamic range easily compares to the human eye. A human being can distinguish objects both in starlight during night time or in bright sun light, even though on a moonless night objects receive only approximately $1/_{1,000,000,000}$ of the illumination they would on a bright sunny day: this corresponds to a dynamic range of 90 db. However, the eye needs time to adjust to different light levels. Thus, the dynamic range of the human eye without adjustment of the pupil is only approximately 30 db. In contrast, the differences between very dark and very light spots in a picture taken by a modern camera system can easily be larger than those the human eye can distinguish without adaptation; with a modern camera system it is thus possible to determine fine details in very dark spots even while very bright spots are also present in a picture. The dynamic range of a modern camera system may also easily surpass the dynamic range of a conventional display.

It should also be noted that not only the dynamic range of a picture to be produced or reproduced needs amendment but also a correction is necessary due to numerous technological limitations such as limited color gamut and contrast, limited spatial resolution, usually limited field of view and nontrivial workarounds to achieve stereo capacity. Furthermore, in order to reproduce the correct appearance, it is often necessary to simulate the behavior of the human visual system. Here, it should be noted that the viewing conditions of an observer, observing either the scene or a display may be completely different. Tone mapping is very helpful in the production of realistic images and several operators have been proposed. However, it is still prohibitive to have a complex tone mapping operator that produces high quality results in real time due to restriction of the data processing capacity, in particular for large high definition pictures. Two main tone mapping operator classes exist, namely tone reproduction curves (TRCs) and tone reproduction operators (TROs). Both will be referred to as tone mapping functions in the present application.

TRC algorithms are efficient because the operation is applied to pixels independently and thus can be performed in parallel using a simple look-up table. In addition, models also exist that are able to capture some important aspects, such as visual adaptation. However, TRCs fail to capture the important information on local contrast that could be represented in the spatial context of neighboring image pixels which is of great importance for the human visual system.

The algorithms based on TROs when compared with TRCs are able to capture the important information on local contrast. Unfortunately, they typically introduce artefacts in some parts of the image, such as dark halos, and are computationally more demanding.

Now, images that have a high dynamic range have a higher pixel depth than the more conventional low dynamic range images. The increased bit depth per pixel presented by high dynamic range (HDR) image formats can account for all the dynamic range visible by the human visual system. Both the increased number of pixels in a high definition (HD) picture and the improved dynamic information in a HDR picture increase the amount of data relating to a picture.

This poses severe technical problems. The data size gives rise to problems when transmitting and/or storing image data. These problems become more severe when video data consisting of a plurality of frames need to be handled instead of single digital images. For high dynamic range still pictures, the above-mentioned tone mapping reduces the dynamic range of a picture in a way that attempts to allow the user to observe all details relevant to the human eye even if this would not be possible in a conventional scene and/or adaptation. Reducing the dynamic range may also be used to reduce the amount of data necessary to fully describe the picture. Furthermore, for video streams consisting of a sequence of digital images (frames), methods that allow reduction, i.e. compression, of data have been described such as the MPEG-standard.

However, despite the fact that both the high definition as well as high dynamic range information may be compressed, the results when applying such conventional compression schemes to a stream of video data are still not satisfying for a user.

High Dynamic Range Images (HDRIs) consume a considerable amount of memory, and efficient compression methods are not easy to implement. A typical low dynamic range image consists of 24 bit-per-pixel (bpp) RGB data that can be compressed considerably. On the other hand, an uncompressed HDR image typically uses 96 bpp for an RGB image. Accordingly, an uncompressed HDR image consumes four times the memory of an uncompressed, low dynamic range (LDR) image.

The first attempt to compress the HDR data was introduced by G. WARD in REAL PIXELS, Graphics Gems, 2:15-31, 1991. It has been suggested that the 96 bpp image is compressed to 32 bpp using a light bit mantissa for each channel and a shared light bit exponent. The resulting RGBE representation however does not cover the full visible color gamut since it does not allow for negative values. Other formats have been suggested for example in G. W. LARSON: LOGLUV ENCODING FOR FULL-GAMUT, HIGH DYNAMIC RANGE IMAGES, Journal of Graphics Tools, 3(1):15-31, 1998. Further suggestions, using different data formats can be found in INDUSTRIAL LIGHT & MAGIC, OpenEXR., http://www.openexr.org, 2002 and G. McTAGGERT, C. GREEN and J. MITCHELL: HIGH DYNAMIC RANGE RENDERING IN VALVE'S SOURCE ENGINE, in SIGGRAPH '06: ACM SIGGRAPH 2006 Courses, page 7, New York, N.Y., USA, 2006, ACM Press. Furthermore, several extension to standard compression algorithms have been presented such as for example in G. WARD: JPEG-HDR: A BACKWARDS-COMPATIBLE, HIGH DYNAMIC RANGE EXTENSION TO JPEG, in: CIC 13th: Proceedings of the Thirteenth Color Imaging Conference, The Society for Imaging Science and Technology, 2005; G. WARD: A GENERAL APPROACH TO BACKWARDS-COMPATIBLE DELIVERY OF HIGH DYNAMIC RANGE IMAGES AND VIDEO in: CIC 14th: Proceedings of the Fourteenth Color Imaging Conference, The Society for Imaging Science and Technology, 2006; G. WARD and M. SIMMONS: SUB BAND ENCODING OF HIGH DYNAMIC RANGE IMAGERY in: APGV '04: Proceedings of the 1st Symposium on Applied Perception in Graphics and Visualization, pages 83-90, New York, N.Y., USA, 2004, ACM Press.

Here, backwards-compatible HDR-JPEG extends the JPEG-standard keeping retro-compatibility. Firstly, an HDR-image is tone mapped using a standard tone reproduction curve and stored as a normal JPEG. Secondly, a sub-band corresponding to HDR information is stored in the "application markers" of the standard for a maximum of 64 Kbytes which is a constraint for encoding high resolution HDR images. HDR-JPEG 2000 is an extension to JPEG 2000 that exploits the support of the standard for 16 bit integer data. With this method, HDR data is transformed into the logarithmic domain, quantized into integers and compressed using standard JPEG 2000 encoding.

While the suggested compression schemes known in the art are helpful for still images, they leave room for improvement and are hardly applicable for HDR videos.

There are two important applications for video data streams providing HDR video data. The first application is movie pictures such as produced by video cameras; the second is graphic applications such as in video games and so forth. Here, there is a particular need to compress the high dynamic range of textures. HDR textures are typically used in interactive applications; due to the size of HDR images they need to be compressed. Methods related to high dynamic range texture compression can either be designed for general purpose graphics hardware or custom made processors that allow decoding of the HDR textures in real time.

The problem of HDR texture compression has been addressed by numerous authors, compare e.g. J. MUNKBERG, P. CLARBERG, J. HASSELGREN, and T. AKENINE-MÖLLER: HIGH DYNAMIC RANGE TEXTURE COMPRESSION FOR GRAPHICS HARDWARE in: ACM Trans. Graph., 25(3):698-706, 2006; K. ROIMELA, T. AARNIO and J. ITÄRANTA: HIGH DYNAMIC RANGE TEXTURE COMPRESSION in: ACM Trans. Graph., 25(3): 707-712, 2006; K. ROIMELA, T. AARNIO and J. ITÄRANTA: EFFICIENT HIGH DYNAMIC RANGE TEXTURE COMPRESSION in: S13D '08: Proceedings of the 2008 Symposium on Interactive 3D Graphics and Games, pages 207-214, ACM Press, New York, N.Y., USA, 2008. One problem of the methods described in the prior art is that they require complex hardware.

For HDR videos, HDR-MPEG compression schemes have been proposed in: R. MANTIUK, A. EFREMOV, K. MYSZKOWSKI, and H.-P. SEIDEL: BACKWARD COMPATIBLE HIGH DYNAMIC RANGE MPEG VIDEO COMPRESSION, ACM Trans. Graph., 25(3):713-723, 2006; R. MANTIUK, G. KRAWCZYK, K. MYSZKOWSKI, and H.-P. SEIDEL: PERCEPTION-MOTIVATED HIGH DYNAMIC RANGE VIDEO ENCODING, ACM Trans. Graph., 23(3):733-741, 2004. The suggested schemes can be used as an extension to MPEG-4. As HDR-JPEG backwards-compatible videos are tone mapped, for each frame a reconstruction function is calculated when storing the HDR data. To improve quality, residuals of frames are saved in the video stream. While these algorithms present high quality and high compression ratios, they are not ideally suitable for real time applications since their lack of hardware support results in complex implementations, particularly due to the complex fetching mechanisms required for decoding.

A further approach has been adopted by L. Wang, X. Wang, P-P Sloan, L-Y Wei, X. Tong and B. Guo: Rendering from compressed high dynamic range textures on programmable graphics hardware, I3D '07: Proceedings of the 2007 symposium on Interactive 3D graphics and games, 17-24, ACM Press, New York, 2007.

In this paper it has been suggested to separate HDR and LDR parts of the images and to quantize two 8-bit textures compressed using S3TC with their residuals. The reconstruction (decoding) was performed by combining HDR and LDR parts using a simple shader. A more general compression scheme has recently been proposed in S. LEFEBVRE and H. HOPPE: COMPRESSED RANDOM-ACCESS TREES FOR SPATIALLY COHERENT DATA in: Rendering techniques (Proceedings of the Eurographics Symposium on Rendering), Eurographics, 2007. The method described therein relies on a hierarchical data structure that represents spatially coherent graphics data. Despite the good compression the shader is complex and about twenty times slower than a fetch to a compressed texture using S3TC.

It should be noted that hardware solutions for RGBE filtering and so forth have been suggested as well, compare M. KILGARD, P. BROWN and J. LEECH: GLEXT TEXTURE SHARED EXPONENT in: OpenGL Extension, http://www.opengl.org/registry/specs/EXT/texture_shared_exponent.txt, 2007 as well as in D. BLYTHE: THE DIRECT3D 10 SYSTEM in: ACM Trans. Graph., 25(3):724-734, 2006.

It has also already been suggested to use inverse tone mapping for compression. Here, a multi-scale image processing technique for both tone mapping and companding has been proposed by Y. LI, L. SHARAN and E. H. ADELSON: COMPRESSING AND COMPANDING HIGH DYNAMIC RANGE IMAGES WITH SUB BAND ARCHITECTURES in: SIGGRAPH '05: ACM SIGGRAPH 2005 Papers, pages 836-844, New York, N.Y., USA, 2005, ACM Press. However, the operation is not efficient on current hardware given the fact that the compressed low dynamic range has to be decomposed into sub bands. A compression method based on an inverse tone mapping operator and JPEG was presented in M. OKUDA and N. ADAMI: RAW IMAGE ENCODING BASED ON POLYNOMIAL APPROXIMATION, IEEE International Conference on Acoustics, Speech and Signal Processing, 2007, ICASSP 2007, pages 15-31, 2007. The tone mapping operators based on the Hill functionals for inverse tone mapping are calculated using minimization techniques and then encoded using JPEG. The residuals are calculated for increased quality and are compressed using wavelets. However, wavelets and DCT decompression are computational expensive to evaluate and do not provide a constant decompression time which is particularly disadvantageous in real time critical applications.

A compression scheme for still images and videos using a tone mapping operator based on a model of a human cones was presented in J. H. V. HATEREN: ENCODING OF HIGH DYNAMIC RANGE VIDEO WITH A MODEL OF HUMAN CONES, ACM Trans. Graph., 25(4):1380-1399, 2006.

The above discussion shows that despite numerous attempts at compressing high dynamic range images, the results achieved thus far are not completely satisfying in view of compression efficiency, quality of result images and computational load. These problems increase when streams of video frame data need to be handled. As long as the stream of video data corresponds to a slide show of only still images, it will be obvious that a tone mapping function used for compression can be altered whenever the still image (and thus in a context of a video stream the scene) changes. However, in a conventional video stream, there are a number of cases where the scene does not change abruptly, for example in cases where a panning, tilting or zooming in of a camera occurs and/or one or a plurality of objects move within a given picture and/or the illumination changes, for example in cases where a room is shown where lights are switched on or off. In cases like this, it is necessary to provide both an efficient compression as well as a compression that does not lead to severe artefacts in a reproduced video.

SUMMARY OF THE INVENTION

The present invention aims at providing an improved method of compressing a stream of video frame data as well as devices for implementing the method.

Viewed from one aspect, the invention provides a method of producing a compressed video data stream by compressing a stream of relatively high dynamic range video frames, wherein for at least some original video frames in the stream, the method comprises the steps of:
  (a) from the original frame in the stream, using a filter to extract a base frame;
  (b) using the base frame and the original frame to provide a detail frame relating to fine details in the original frame;
  (c) generating a tone mapping operation for the base frame and applying the tone mapping operation to the base frame to generate a relatively low dynamic range base frame;
  (d) storing information in respect of the tone mapping operation applied to the base frame;
  (e) subjecting the relatively low dynamic range base frame to temporal compression, and subjecting the detail frame to temporal compression;
  (f) creating final frame data consisting of the compressed relatively low dynamic range base frame, the compressed detail frame, and the information in respect of the tone mapping operation applied to the base frame; and
  (g) including the final frame data in the compressed video data stream.

Viewed from another aspect the invention provides a data processing module for producing a compressed video data stream by compressing a stream of relatively high dynamic range video frames, the module being configured such that for at least some original video frames in the stream, the module will carry out steps (a) to (g) in the method set out above.

Viewed from another aspect the invention provides a device, such as a camera or other imaging device, which includes a data processing module as set out above.

Viewed from another aspect the invention provides a computer software product comprising instructions which will cause a data processing module to be configured to carry out a method of producing a compressed video data stream by compressing a stream of relatively high dynamic range video frames, such that for at least some original video frames in the stream, the module will carry out steps (a) to (g) in the method set out above.

The computer software product could be in the form of signals transmitted from a location, such as a remote location over a network, or could be in non-transitory form as a physical medium such as a CD or DVD, or a solid state memory unit, or any memory device for data processing equipment such as a disk drive, carrying the software instructions.

Viewed from another aspect, the invention provides a method of decoding a compressed video data stream obtained by carrying out a method as set out above wherein, using the final frame data in the video data stream, the relatively low dynamic range base frame is obtained from the compressed relatively low dynamic range base frame, the detail frame is obtained from the compressed detail frame, using the information in respect of the tone mapping operation applied to the base frame, the base frame is reconstructed via inverse tone mapping; and the base frame is combined with the detail frame to obtain a relatively high dynamic range frame to be reproduced.

Viewed from another aspect the invention provides a data processing module for decoding a compressed video data stream by carrying out the decoding method set out above.

Viewed from another aspect the invention provides a computer software product comprising instructions which will cause a data processing module to be configured for decoding a compressed video data stream by the decoding method set out above.

The computer software product could be in the form of signals transmitted from a location, such as a remote location over a network, or could be in non-transitory form as a physical medium such as a CD or DVD, or a solid state memory unit, or any memory device for data processing equipment such as a disk drive, carrying the software instructions.

Viewed from another aspect the invention provides a device such as an image playback device, which includes a data processing module as set out above for decoding a compressed video data stream.

Viewed from another aspect the invention provides data processing equipment such as a general purpose computer, configured for decoding a compressed video data stream by carrying out the decoding method set out above.

Viewed from another aspect the invention provides a computer software product comprising instructions which will cause data processing apparatus such as a computer to be configured for decoding a compressed video data stream by the decoding method set out above.

The computer software product could be in the form of signals transmitted from a location, such as a remote location over a network, or could be in non-transitory form as a physical medium such as a CD or DVD, or a solid state memory unit, or any memory device for data processing equipment such as a disk drive, carrying the software instructions.

Viewed from another aspect the invention provides a method of compressing a stream of video frame data wherein tone mapping functions are determined for video frames of said stream, said tone mapping functions being different from one another for frames relating to different scenes, wherein the tone mapping functions will be altered for frames of the stream relating to the same scene.

BRIEF DESCRIPTION OF THE DRAWINGS

The invention will be better understood by reference to the following description of preferred embodiments which are by way of example only, and with reference to the accompanying drawings, in which FIG. 1 sets out a method of compressing video signals in accordance with the invention.

DETAILED DESCRIPTION OF THE PREFERRED EMBODIMENTS

In some preferred embodiments of the invention there is provided a system for compressing, and display of high dynamic range (HDR) video. On the compression side, for each frame in the sequence, a tone mapping operator and associated parameters are established. The luminance from the HDR frame is extracted to provide a base frame and compressed to a lower bit representation using the tone mapping operator. This is then compressed into a video stream using video compression. A detail frame is created from the HDR frame to encode chroma (color) information, optionally using information from the compressed stream to improve quality. This detail frame is encoded into a separate video stream using video compression. The tone mapping operators and tone mapping parameters are also saved for each frame. These two streams and the tone mapping information are then used during playback to reconstruct the HDR video sequence, which then can be displayed. The recombination of the two streams follows an inverse tone mapping process for the luminance stream (using the inverse of the tone mapping operator and parameters associated with the frame), and a combination of this reconstructed luminance with the chroma information too for a resultant frame.

The choice of tone mapper is decided at each frame. It is likely that the same or similar tone mapper will be used each frame within the same scene but this is not absolutely essential. It depends on the circumstances and will certainly be different if there is a sudden change, e.g. a light in the scene is suddenly turned off thus altering the overall luminance.

Frequently there will be a plurality of scenes and the tone mappers used for one scene may be different from those used for another scene.

Thus, in some embodiments there is provided a method of compressing a stream of video frame data wherein tone mapping functions are determined for video frames of the stream, the tone mapping functions being different from one another for frames relating to different scenes and wherein the tone mapping functions may be altered for frames of the stream relating to the same scene.

It has been found that it is may be advantageous to determine a different tone mapping function not only for every scene but to change the tone mapping function even while the same scene is shown in a video stream. Some embodiments of the present invention thus provide a stream of video data which has a significantly better quality compared to a video stream where a change of tone mapping function is only effected for a change of scene. It is possible and preferred to apply the method of compressing the stream to high definition video data, i.e. images that comprise a large number of pixels. Here, the present invention provides advantages as fine spatial details offered by high definition video data can be more clearly identified while the scene lasts.

In some embodiments of the invention, it is preferred to alter the tone mapping function within a scene only gradually. By altering the tone mapping function only gradually, the differences from frame to frame will be small and thus the received image will seem to be more natural. It should be noted that in cases where, without a change of scene, the illumination of a scene is altered for example by switching on or off a light, exceptions from the general rule that the tone mapping function is to be altered gradually only, can be made.

In embodiments of the invention, it is possible to evaluate the overall luminance of an image and to allow for larger changes when there is a significant change of luminance from frame to frame. However, changes like this could also be accounted for by handling luminance separately.

The gradual change of the tone mapping function can be achieved by evaluating both a given frame as well as a plurality of previously observed frames and/or frames that will subsequently follow within the data stream. This can be effected either by calculating the average of image data and/or by calculating data derived from original frames such as bilaterally filtered base frames and/or by determining a tone mapping function for any given frame in response to tone mapping functions determined for previous frames.

By relating the current tone mapping function to both a given frame and a number of previously obtained tone mapping functions instead of the frames they are derived from, the amount of data is significantly reduced in comparison to cases where a plurality of video frames has to be evaluated in order to determine one single tone mapping function. Here, it should be noted that once a base frame, for example having reduced spatial resolution, is determined from an initial HDR frame using e.g. bilateral filtering, the amount of data that needs to be handled for determining the tone mapping function is significantly reduced, thus allowing even for the calculation of averages and so forth. As the determination of a tone mapping function for a base frame is computationally more simple without degrading image quality, it is preferred to separate the base frame information from a given HDR frame prior to determining the tone mapping function and to determine the tone mapping function in response to the base frame information extracted from the initial HDR frame. It is also possible to determine base frame information only for some frames of the video stream; however, it is preferred to determine a base frame for the majority of frames of the initial HDR frames and to operate on this majority of frames in order to determine the tone mapping function. It is particularly preferred to determine a base frame for every frame of the initial HDR video stream.

It is possible to determine a low dynamic range base frame in response to a base frame extracted from the initial HDR frame and information relating to the tone mapping function for the respective base frame. It should be noted that it is preferred to include information regarding the current tone mapping function used for any given frame in the stream of compressed video data. This can be done in a plurality of ways without significantly increasing the amount of data needed. In particular, it is possible to refer to a number of predefined tone mapping functions and to select one of a number of predefined tone mapping functions for any given frame. This number and any associated parameters can be included in the compressed stream of video frame data. The decoder will usually have access to or comprise a look-up-table for tone mapping functions.

It is possible to predefine every single tone mapping function and to provide information on the tone mapping function for the decoder. In the decoding process, it is also possible to amend an initial tone mapping function so as to directly take into account the particular properties of a device for displaying the actual video frame data. Thus, the look-up-tables for different display devices may relate to different inverse tone mapping functions for a given look-up-table entry. It should be noted that the number of predefined different tone mapping functions can be comparatively small and that between 16 and 512 predefined tone mapping functions should generally be sufficient for encoding and compressing any given HDR video frame data stream.

However, it is also possible to allow the user to define one tone mapping function or a plurality of tone mapping functions as needed. Since any information of a user defined tone mapping function can be included in the compressed stream of video frame data, it is possible to transfer the information of user defined tone mapping functions from the encoder to the decoder.

It should be noted that once the base frame has been determined from the initial high dynamic range frame, it is possible to determine a detail frame in response to both the initial frame and the base frame. The detail frame can preferably be obtained by subtraction of the base frame from the HDR frame and/or by division of the base frame.

It should be noted that generally the detail frame has a significantly lower dynamic range than the base frame even without dynamic compression. The low dynamic range base frame can be subjected to further compression, in particular to temporal compression using for example conventional schemes as known in the art. It should also be noted that the detail frame can also be compressed further using for example conventional temporal compression schemes. Accordingly, a final frame in the stream of compressed HDR data generally will comprise information on the tone mapping function used for the particular frame, as well as a compressed base frame information and compressed detail frame information. Additional information such as data headers and so forth may obviously be included.

When decoding the video stream, the low dynamic range base frame information and the low dynamic range detail frame information can be obtained as known per se in the art. Then, applying the tone mapping information, the initial high dynamic range base frame can be reconstructed and the detail frame information as re-obtained from the temporally compressed detail frame can be added and/or in other ways combined with the uncompressed base frame information to obtain a reproduced HDR frame of high quality. A video stream obtained in this way will provide high quality images while not imposing high computational loads on any graphics hardware processing the initial HDR video frame data.

It should be noted that it is possible and preferred to include in the compressed video data stream inter alia luminance information referring to the overall luminosity of a frame and/or of parts thereof separately from the tone mapping information.

It should be noted that although embodiments of the present application refer generally to frames and one tone mapping function used for one single frame, it would be possible to use different tone mapping functions for different areas of a given frame without deviating from the spirit of the present invention. In cases where different tone mapping function information is determined for different areas, a plurality of possibilities exist and it should be noted that any possibility can be applied exclusively or in combination with others. In particular, it is possible to determine a tone mapping function information for a fixed area, for example a fixed rectangle in a given frame. This area may or may not relate to a given object; in particular, it is possible to provide a tone mapping function for moving objects in the initial stream of video frame data. This allows for maintaining tone mapping for any given object moving through a scene. It should be noted that this may require the identification of objects within the video data stream to be compressed. However, since it is possible to identify moving objects within the base frames, the amount of data that needs to be handled can be comparatively small even for high definition pictures. If a plurality of tone mapping functions are determined for one frame, then it is obviously preferred to gradually alter each single tone mapping function for any given area from frame to frame. However, this may not hold for special cases, e.g. when a scene shows a room with a TV set where a movie is shown; now, even if the room remains unchanged otherwise and tone mapping functions for any place in the room other than for the TV set shown change gradually only, there may be large changes in the TV set thus requiring non-gradual changes in the tone mapping function.

Embodiments of the present invention also relate to a video encoder for decoding a stream of video data as described with respect to the methods above. A video encoder can be implemented in software or in hardware, e.g. as ASIC. It will be apparent to the average skilled person how a decoder has to be designed once compression system of the present invention is known.

Furthermore, it is possible to provide an imaging device such as a video camera that stores and/or transmits a video data stream obtained according to a method as described above.

It is possible to provide streams of video data according to the present invention, for example on DVDs or/as downloadable video data streams.

Embodiments of the invention also provide to a data carrier carrying video data compressed according to the present invention.

Figure 1:
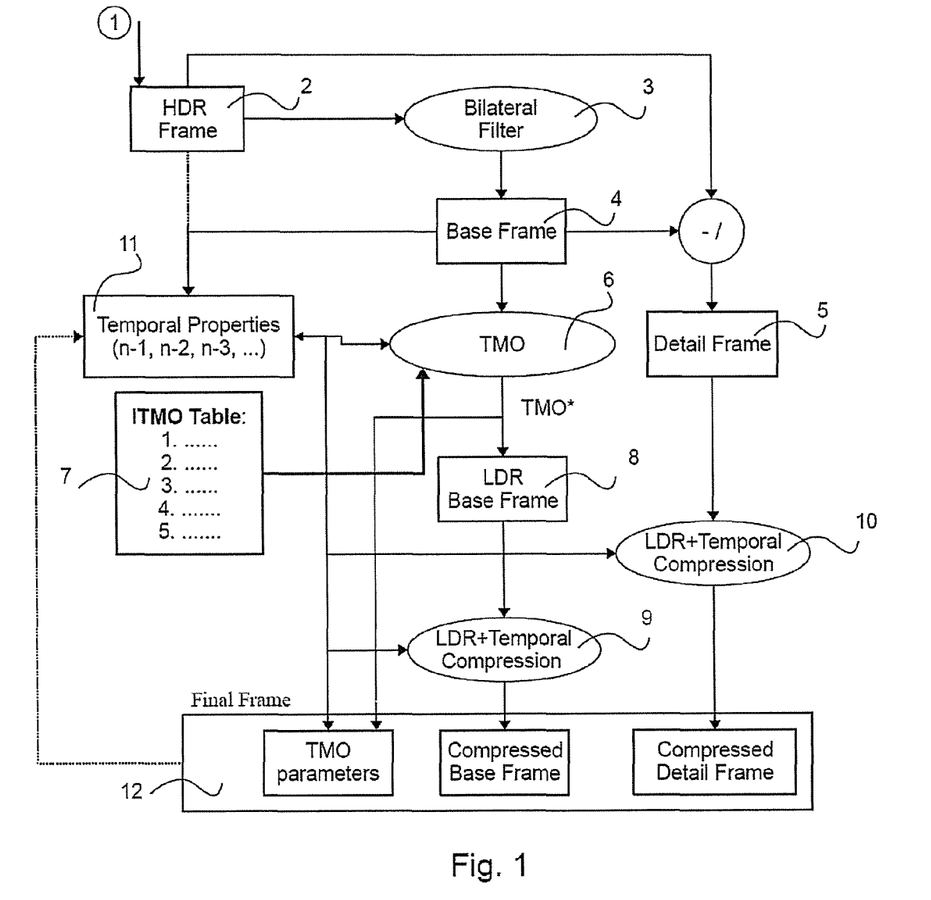

Referring now in detail to the drawings, in FIG. 1, a stream of video frame data 1 consisting of high definition and high dynamic range video frames is provided. A single HDR frame 2 of the video stream 1 is inputted to a filter 3 which may be implemented by either soft- or hardware and which is used to extract a base frame 4 from the HDR frame 2. The filter 3 may be a bilateral filter. The base frame contains luminance information.

The base frame 4 is used together with the initial HDR frame, for example by subtracting the base frame 4 from the HDR frame 2 and/or by dividing the HDR frame 2 by the base frame 4 so as to provide a detail frame 5 relating to the fine details of the HDR frame 2, namely chroma information. The base frame 4 is further fed to a tone mapping operation stage 6 in which one of a plurality of predefined tone mapping functions stored in a tone mapping look-up-table 7 is selected for the base frame.

The tone mapping function 6 selected for a given base frame 4 is altered to a tone mapping function TMO* with respect to the temporal properties of HDR frames and/or previous tone mapping functions as will be described later on. The tone mapping function TMO* is then applied to the base frame 4 so as to obtain a low dynamic range base frame 8. The low dynamic range base frame 8 and the detail frame 5 are subjected to temporal compression algorithms separately at stages 9 and 10 respectively. The temporal compression schemes may be as known per se in the art and may relate inter alia to MPEG encoding and so forth.

From the temporally compressed detail frames and base frames 9 and 10 and the temporally corrected tone mapping function TMO*, a final frame is constructed. In order to obtain a high quality compressed video stream, in this embodiment described the tone mapping function is determined with respect to tone mapping functions previously obtained for previous frames. Thus, the tone mapping function for a given base frame is fed to a temporal property stage 11 which stores the properties of a number of previous tone mapping functions obtained for previous frames of the same scene. This can be done by storing the number of the previous tone mapping functions in a tone mapping function table 7 and/or by storing the entire tone mapping function. It should be noted that a scene change identifier stage may be provided to reset the temporal property stage on any change of scene (not shown). The temporal property stage 11 on receiving an initial tone mapping function as initially determined for a base frame 4 determines whether or not the change in the tone mapping function compared to prior tone mapping function is large or not. It will be apparent to the skilled person that any such deviation can be weighted so that particular parts of the tone mapping curve have a weight higher than others.

It would also be possible to store tone mapping functions in tone mapping function table 7 in a way so that small changes of the look-up table-entry number correspond to small changes in the tone mapping function and allows for a particularly simple way of determining whether or not the change from one tone mapping function of a given base frame to previous base frames is large or not. If the change in tone mapping function 6 is gradual, then the actual tone mapping function TMO* corresponds to the initial tone mapping function determined for base frame 4. If the changes of the tone mapping function determined for a given base frame 4 are too large, then the initial tone mapping function is corrected to a tone mapping function which corresponds closer to previous tone mapping functions. This can be determined by simple comparators. Accordingly, the change of tone mapping functions is small within a scene and thus the sequence of frames can be shown based on the compressed video data stream 12 which is of high quality.

Figure 2:
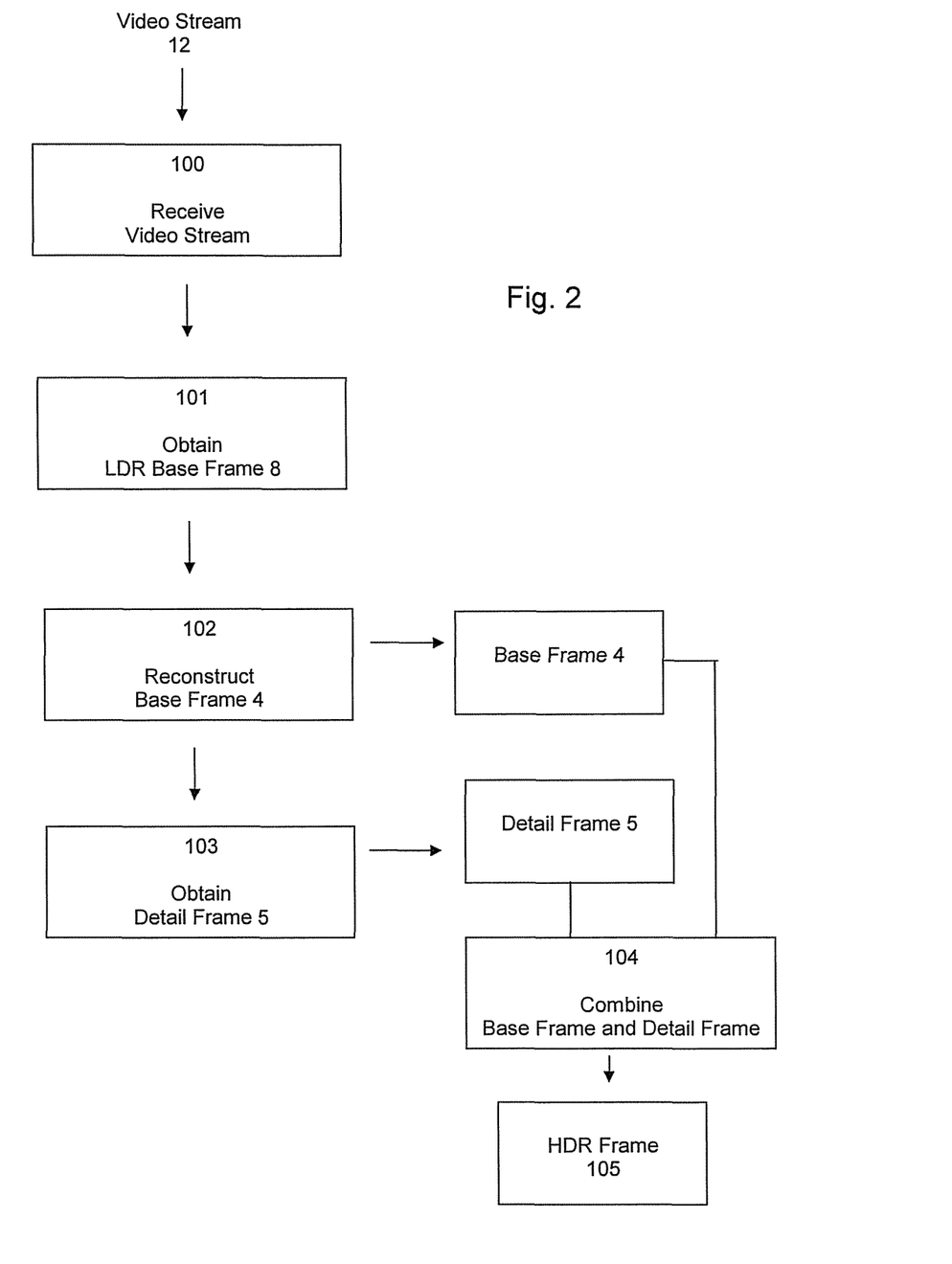
FIG. 2 sets out a method for decoding the compressed video signals.

FIG. 2 outlines a decoding sequence. At step 100, the compressed video stream is received 12. At step 101, using the final frame data in the video data stream 12, the relatively low dynamic range base frame 8 is obtained by decompression from the compressed relatively low dynamic range base frame. At step 102, using the information in respect of the tone mapping operation applied to the base frame, the base frame 4 is reconstructed via inverse tone mapping. At step 103, the detail frame 5 is obtained by decompression from the compressed detail frame. At step 104 the base frame is combined with the detail frame 5 to obtain a relatively high dynamic range frame 105 to be reproduced. This process is repeated for each frame in the stream 12.

Figure 3:
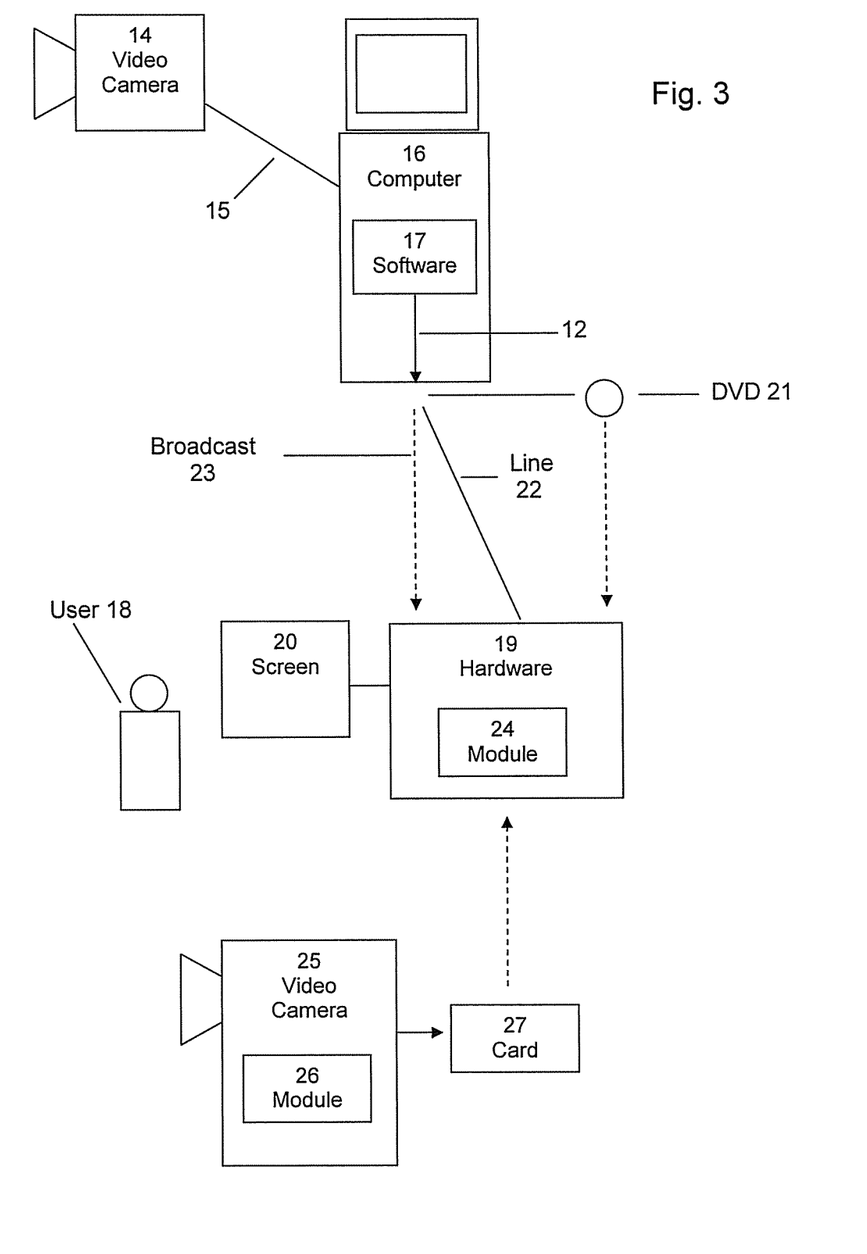
FIG. 3 sets out diagrammatically an overall system for putting the invention into effect.

FIG. 3 sets out the overall system 13 diagrammatically. Video data can be captured by a variety of devices such as a standard video camera 14 which transmits the captured data 15 to a computer 16 where the data is compressed by a software package 17 by a method according to the invention. The compressed video stream 12 may be transmitted to a user 18 with image viewing hardware 19 including a screen 20, via various routes, For example it may be written to a DVD 21 which is transported to the user for playing on the hardware 19, or it may be transmitted by a cable or broadband telephone line 22 to the hardware 19, or it may be transmitted as a terrestrial or satellite broadcast 23 to the hardware 19. The hardware 19 may be a television, set top box, personal computer, mobile phone, laptop computer, netbook computer, personal information device or any other device that can display the video. The hardware contains a software and/or hardware module 24 for decoding the video stream to a form suitable for display on the screen 20. An alternative video camera 25 includes a compression module 26 which carries out the compression method in the camera. In this embodiment a data card 27 written with compressed video data by the camera 25 is transported to the user 18 where it may be read by the hardware 19.

In some embodiments of the invention, there is provided a method of producing a compressed video data stream 12 by compressing a stream of relatively high dynamic range video frames 2. A bilateral filter 3 extracts a base frame 4 with luminance information. The base frame 4 and the original frame 2 are used to provide a detail frame 5 with chroma information. A tone mapping operation 6 is selected and applied to the base frame to generate a relatively low dynamic range base frame 8, which is then compressed 9. The detail frame 5 is compressed separately. Final frame data 12 is then created, consisting of the compressed relatively low dynamic range base frame, the compressed detail frame, and stored information in respect of the tone mapping operation that had been applied to the base frame.

The above embodiments are described by way of example only and are not limiting on the scope of the invention, which is as defined in the appended claims.

What is claimed is:

1. A method of producing a compressed video data stream by compressing a stream of high dynamic range video frames, wherein for at least some high dynamic range original video frames in the stream which include color and luminance data, the method comprises the steps of:
   (a) firstly from the high dynamic range original frame in the stream, using a filter to extract luminance data to form a high dynamic range base frame containing the extracted luminance data;
   (b) subsequently using the high dynamic range base frame and the high dynamic range original frame to form a detail frame of fine details containing the color data in the high dynamic range original frame without the extracted luminance data;
   (c) generating a tone mapping operation for the high dynamic range base frame and applying that tone mapping operation to the high dynamic range base frame only, to generate a reduced dynamic range base frame;
   (d) storing information in respect of the tone mapping operation applied to the high dynamic range base frame;
   (e) subjecting the reduced dynamic range base frame to temporal compression, and subjecting the detail frame to temporal compression;
   (f) creating a final frame data consisting of the compressed reduced dynamic range base frame, the compressed detail frame, and the information in respect of the tone mapping operation applied to the high dynamic range base frame by inverting the tone mapping operation; and
   (g) including the final frame data in the compressed video data stream.

2. A method as claimed in claim 1, wherein generating a tone mapping operation for the high dynamic range base frame comprises selecting a tone mapping function from a plurality of predefined tone mapping functions.

3. A method as claimed in claim 2, wherein the tone mapping operation applied to the high dynamic range base frame is obtained by altering an initial tone mapping function selected from the plurality of predefined tone mapping functions, by reference to stored properties of at least one previous tone mapping function obtained for a previous high dynamic range base frame of the same scene.

4. A method as claimed in claim 3, wherein if the difference between the initial tone mapping operation determined for a given high dynamic range base frame and the at least one previous tone mapping function is too large, the initial tone mapping operation is corrected to a tone mapping operation which corresponds more closely to the at least one previous tone mapping function.

5. A method as claimed in claim 2, wherein generating a tone mapping operation for the high dynamic range base frame further comprises selecting parameters associated with the selected tone mapping function.

6. A method as claimed in claim 1, wherein the detail frame is obtained by subtraction of the high dynamic range base frame from the high dynamic range original frame and/or by division of the high dynamic range original frame by the high dynamic range base frame.

7. A method as claimed in claim 1, wherein the compression of the reduced dynamic range base frame and the compression of the detail frame are carried out separately.

8. A method as claimed in claim 1, wherein the filter used to extract the high dynamic range base frame from the high dynamic range original frame is a bilateral filter.

9. A method as claimed in claim 1, wherein luminance information relating to a frame is included in the compressed video data stream separately from the information in respect of the tone mapping operation applied to the high dynamic range base frame.

10. A method as claimed in claim 2, wherein the plurality of predefined tone mapping functions comprises at least one fixed and/or at least one user defined tone mapping function.

11. A method as claimed in claim 1, wherein the high dynamic range video frames are arranged as a plurality of different scenes each comprising a plurality of the video frames, and the tone mapping operations applied to some high dynamic range base frames in respect of the same scene differ from one another.

12. A method as claimed in claim 1, wherein the high dynamic range video frames are arranged as a plurality of different scenes each comprising a plurality of the video frames, and the tone mapping operations applied to high dynamic range base frames in respect of one of the plurality of scenes differ from the tone mapping operations applied to high dynamic range base frames in respect of another of the plurality of scenes.

13. A method as claimed in claim 12, wherein the tone mapping operations applied to some high dynamic range base frames in the same scene differ from one another.

14. A method of decoding a compressed video data stream which has been obtained by carrying out a method as claimed in claim 1 wherein, using the final frame data in the video data stream, the reduced dynamic range base frame containing luminance data is obtained from the compressed reduced dynamic range base frame, the detail frame containing color data is obtained from the compressed detail frame, using the information in respect of the tone mapping operation applied to the high dynamic range base frame, the high dynamic range base frame is reconstructed via inverse tone mapping applied to the reduced dynamic range base frame only; and the high dynamic range base frame is combined with the detail frame to reproduce the original high dynamic range frame.

* * * * *